United States Patent [19]

Fitzsimmons et al.

[11] Patent Number: 4,918,348

[45] Date of Patent: Apr. 17, 1990

[54] BRUSH WEAR INDICATOR

[75] Inventors: Alan H. Fitzsimmons, Toledo; Joe K. Hammer, Bowling Green, both of Ohio

[73] Assignee: Prestolite Electric Incorporated, Toledo, Ohio

[21] Appl. No.: 284,312

[22] Filed: Dec. 14, 1988

[51] Int. Cl.[4] .......... H02K 13/00

[52] U.S. Cl. .......... 310/242; 310/245; 310/247; 200/61.4

[58] Field of Search .......... 310/238, 89, 239, 71, 310/241, 242, 245, 246, 247, 248, 249; 318/541, 542; 340/648; 335/153; 200/61.4

[56] References Cited

U.S. PATENT DOCUMENTS

| | | | |
|---|---|---|---|
| 2,691,114 | 10/1954 | Lykins . | |
| 3,875,436 | 4/1975 | MacFarland | 310/89 |
| 4,024,525 | 5/1977 | Baumgartner et al. . | |
| 4,272,695 | 6/1981 | Buchwald | 310/242 |
| 4,334,188 | 6/1982 | Dudley . | |
| 4,344,072 | 8/1982 | Harper, Jr. | 310/242 |
| 4,348,608 | 9/1982 | Michael | 310/242 |
| 4,366,404 | 12/1982 | Ziegler | 310/242 |
| 4,420,705 | 12/1983 | Kimberlin | 310/242 |
| 4,488,078 | 12/1984 | Orton | 310/242 |
| 4,761,594 | 8/1988 | Rodi et al. | 310/242 |

FOREIGN PATENT DOCUMENTS 1262486 5/1968 United Kingdom .

*Primary Examiner*—R. Skudy

*Attorney, Agent, or Firm*—McAndrews, Held & Malloy, Ltd.

[57] ABSTRACT

An apparatus for detecting the wear of a motor brush includes a spring that biases the brush towards an extended position. A portion of the spring moves along a path towards the extended position as the brush wears, wherein the spring portion makes mechanical contact with a portion of an electrical signal generating device that is disposed in the path to indicate a given amount of brush wear has occurred.

30 Claims, 4 Drawing Sheets

FIG. 3
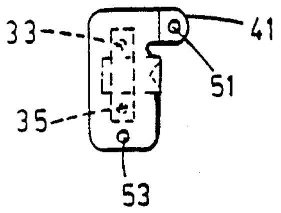
FIG. 4
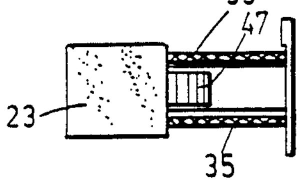
FIG. 5
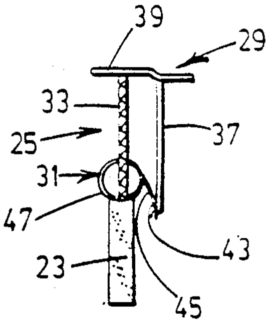
FIG. 7
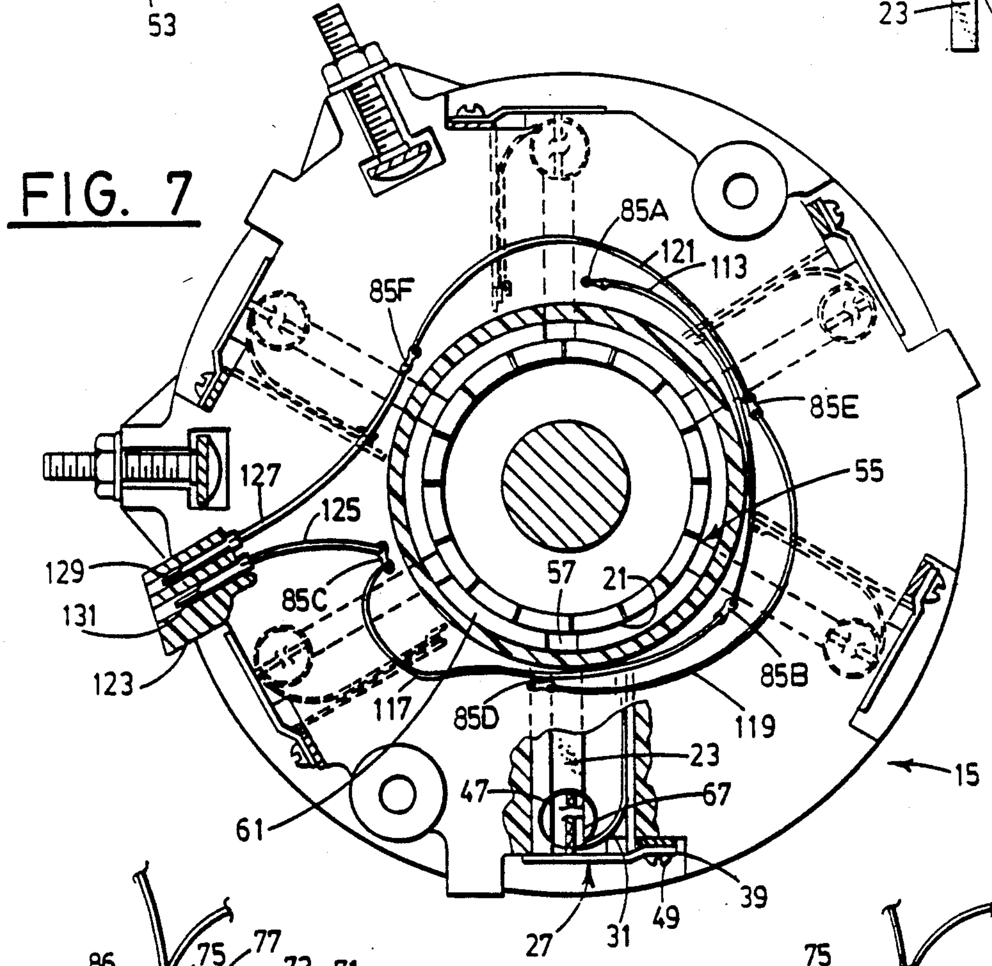
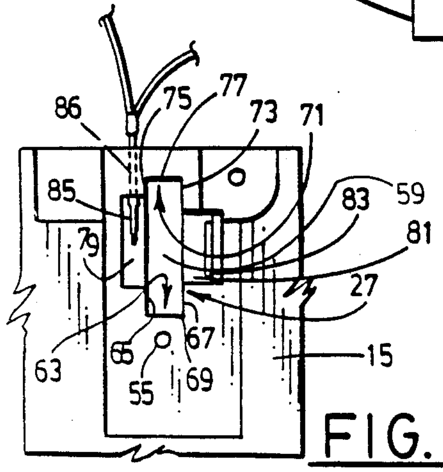
FIG. 8
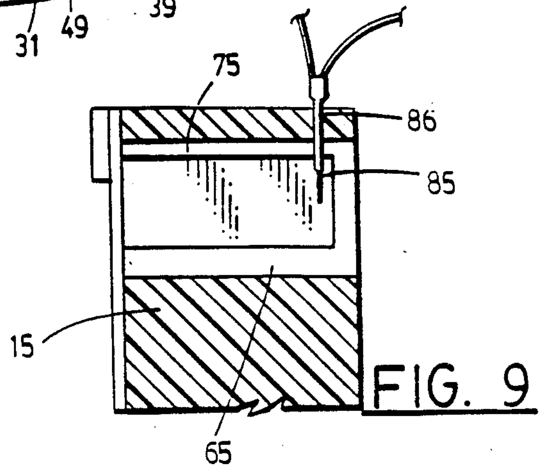
FIG. 9

FIG. 6
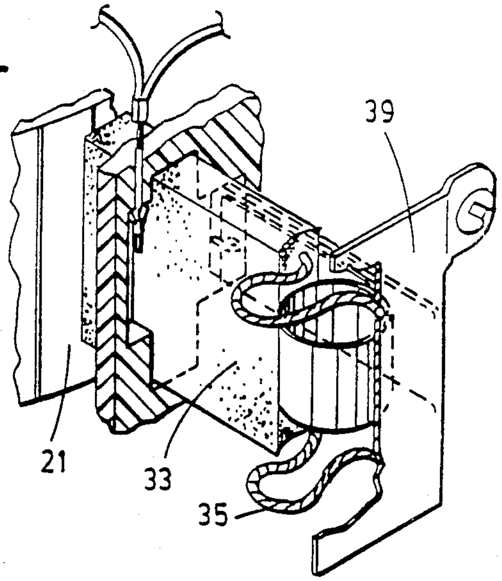
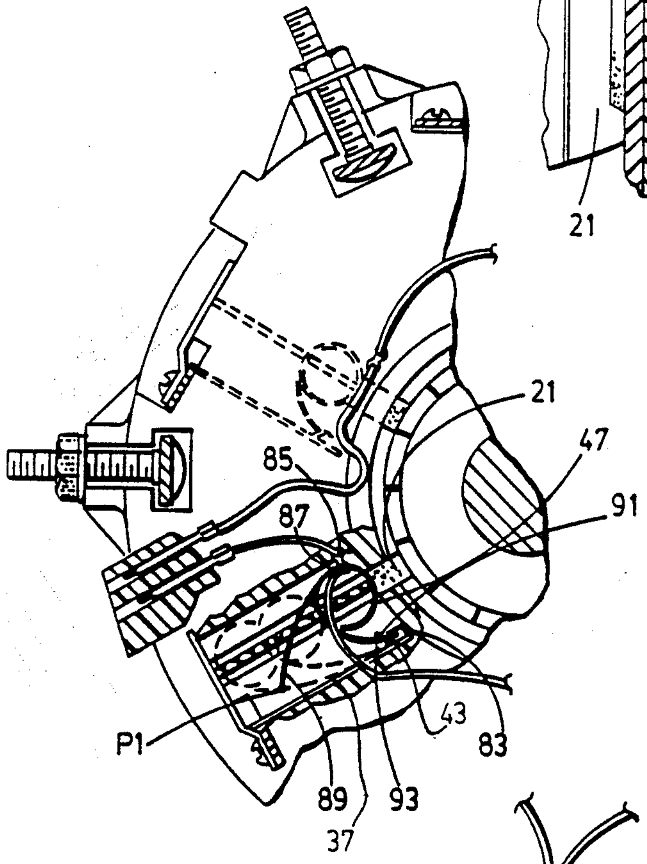
FIG. 10
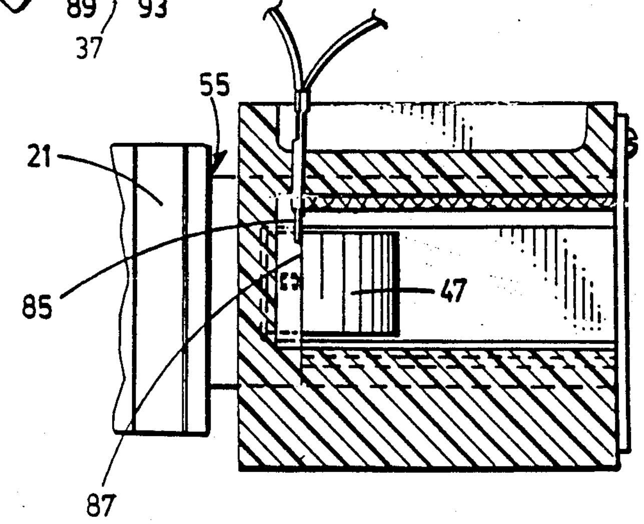
FIG. 11

BRUSH WEAR INDICATOR

BACKGROUND OF THE INVENTION

The invention relates to apparatus for detecting the wear of motor brushes for signaling the need to replace the brushes before damage occurs to the armature, and more particularly relates to a method of indicating brush wear in a DC motor which utilizes a plastic commutator end head.

In appliances such as motors or generators having a rotating armature, a plurality of brushes make sliding electrical contact with the armature as it rotates. The brushes are typically made of a carbon particulate such as graphite and a binder material and may also include metallic particles. One or more holes are drilled in the end of the brush to accommodate current carrying wires which supply current to the brushes. In order to avoid damage to the armature contact surface after the brushes have worn down, a signal is generated when the brush wears to a predetermined point. Generally, a method of brush wear detection involves imbedding an insulated wire into a brush. As the brush wears, eventually the insulation on the wire will be worn away by the rotating commutator. An electrical circuit is completed when the wire touches the commutator.

In order to embed the wire within the brush labor is required as well as cost in the embedding procedure. It would be highly desirable to define a low cost method for indicating brush wear.

SUMMARY OF THE INVENTION

These and other objects of the invention are achieved in a brush assembly in which a spring means biases a brush towards an extended position. The spring includes a portion which moves along a path as the brush is moved towards its extended position during wear of the brush. Upon a brush wearing to a predetermined point, the portion has also moved to a particular location where mechanical contact is made between the spring portion and a portion of an electrical signal generation device.

In the preferred embodiment of the invention a brush assembly including a frame is used to carry a coil spring which is interposed between a pair of current carrying flexible conductors. The coil spring biases the brush to its full extent.

DESCRIPTION OF THE DRAWINGS

FIG. 3 is an end view of a brush assembly of the motor of FIG. 1.

FIG. 4 is a top view of the brush assembly of FIG. 3.

FIG. 5 is a side view of the brush assembly of FIG. 3.

FIG. 6 is a perspective view of the brush assembly of FIG. 3.

FIG. 7 is a top and cross-sectional view of the commutator end head of the motor of FIG. 1.

FIG. 8 is a front view of an opening of the commutator end head of FIG. 7.

FIG. 9 is a side view of the opening of FIG. 8.

FIG. 10 is a partial view of the commutator end head of FIG 7 showing a brush at the point of extended brush wear.

FIG. 11 is a cross-sectional and side view of the brush and commutator end head of FIG. 10.

DETAILED DESCRIPTION OF THE PREFERRED EMBODIMENT

Figure 1:
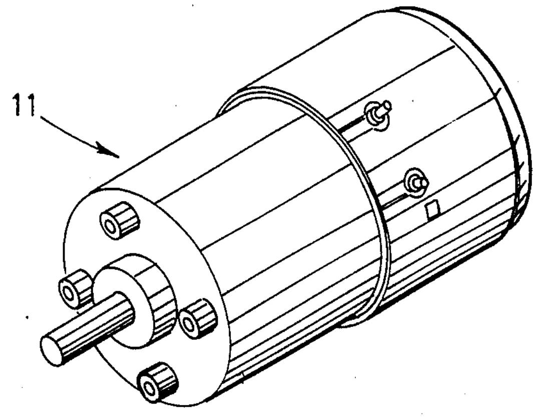
FIG. 1 is a perspective view of a motor having a brush wear indicator of the present invention.
Figure 2:
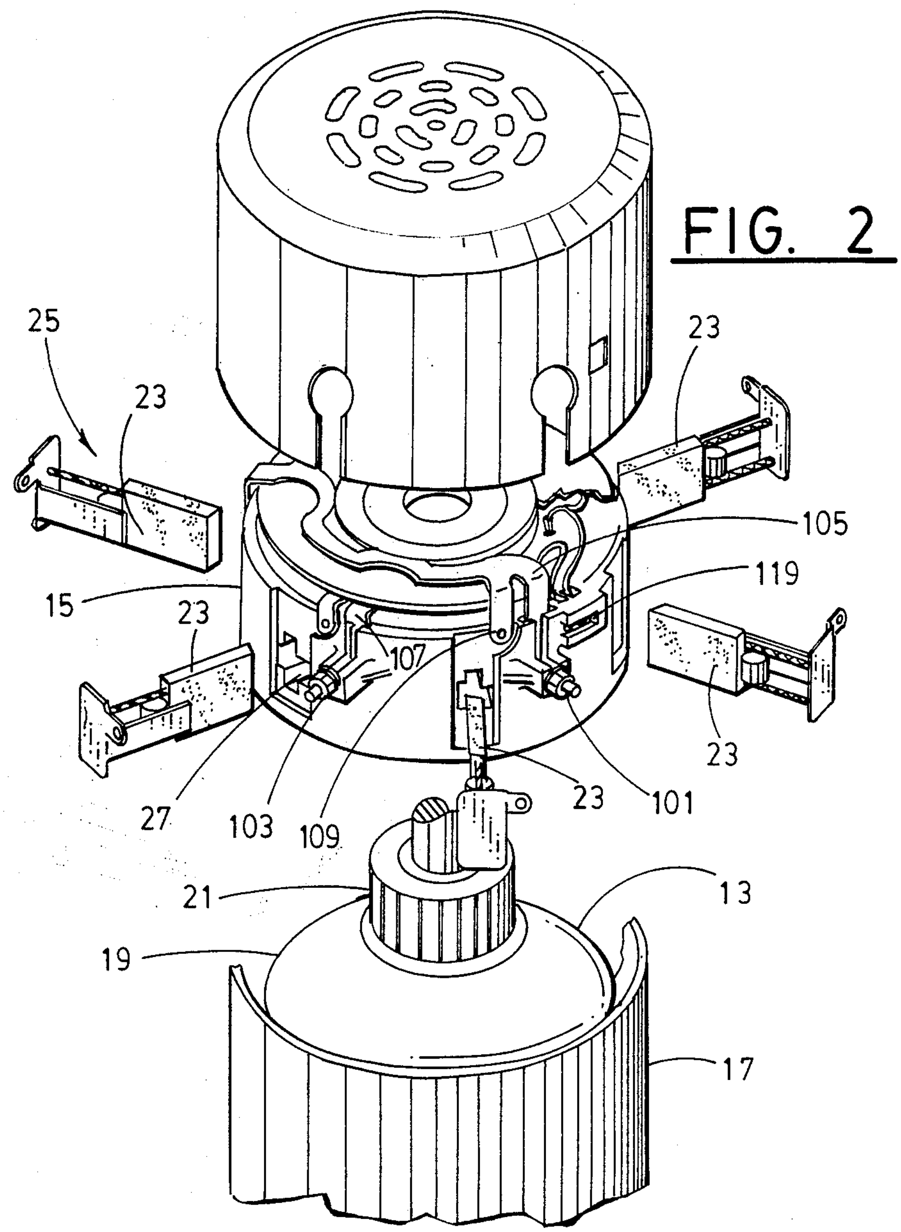
FIG. 2 is an exploded perspective partial view of the motor of FIG. 1.

Referring to FIGS. 1 and 2, a six pole motor 11 is formed from an armature 13 which is rotatably mounted in a motor frame structure formed of a commuter end head 15, a drive end head (not shown) between which armature 13 rotates. The motor frame structure additionally includes a cylindrical outer member 17 which surrounds the coil area 19 of armature 13.

Armature 13 includes a commutator contact surface 21 against which a plurality of brushes 23 make sliding electrical contact. A plurality of magnets (not shown) are housed between cylindrical outer member 17 and the coil area 19 of armature 13 for providing a fixed permanent magnetic field.

Each of the six brushes 23 are stationed in a brush assembly generally indicated by reference numeral 25. Each brush assembly 25 is slid into an opening 27 formed in commutator end head 15 for locating the brushes relative to contact surface 21. The commutator end head 15 is molded from an insulative plastic material.

Referring to FIGS. 3, 4, and 5, brush assembly 25 includes brush 23, a connector plate 29, a constant force or coil spring 31, and a pair of flexible electrical conductors 33,35. Connector plate 29 is stamped from a single piece of metal and includes an elongated arm portion 37, an outer wall member 39 disposed orthogonal to arm portion 37, and a screw securement tab 41.

As shown in FIG. 3, conductors 33,35 have their one ends secured to outer wall member 39 by soldering or the like to brush 23. Holes (now shown) are drilled in brush 23 for receiving the conductor ends which are secured within the holes in a conventional fashion. Conductors 33,35 are flexible (as illustrated in FIG. 6).

Arm portion 37 of the connector plate includes a tongue 43 which is cut from and bent out from the metal forming arm portion 37. Coil spring 31 includes an end portion 45 and a coil portion 47. End portion 45 of coil spring 31 includes an opening (not shown) for receiving tongue 43 in order to attach and position the coil spring onto connector plate 29.

Brush 23 is slidable along a path generally parallel to arm portion 37. As shown in FIG. 5, brush 23 is in its fully extended position in which conductors 33,35 are straightened by the bias pressure of coil spring 31 against brush 23. As brush 23 travels toward outer wall member 39 of connector plate 29, conductors 33,35 flex as illustrated in FIG. 6. Coil spring 31 serves to bias brush 23 outward toward its fully extended position as shown in FIG. 5. Coil spring 31 is biased for coiling tight into a coil. As shown in FIG. 4, the coil portion 47 of the coil spring is located between conductors 33,35.

Referring to FIG. 7, each of the six brush assemblies 25 are shown positioned within and screw secured to commutator end head 15. A screw 49 (FIG. 7) passes through an opening 51 (FIG. 3) in tab 41 and then passes into commutator end head 15 for securing the connector plate 29 into end head 15. Additionally, a second screw receiving opening 53 (FIG. 3) formed in outer wall member 39 receives a screw which passes into end head 15.

As shown in FIG. 7, each brush 23 is forced against commutator contact surface 21. The point at which brush 23 engages commutator contact surface 21 is referred to herein as contact point 55. As the brush face 57 of the brush is worn away by rotation of contact surface 21, coil spring 31 retracts pushing the brush radially inward against the commutator contact surface.

As shown in FIGS. 8 and 9, opening 27 of end head 15 includes several chambers for receiving brush assembly 25. An opening 59 passes from the outer circumference of end head 15 through to the open central area 61 (FIG. 7) of the end head where the armature contact surface 21 is received. Opening 59 is shaped for receiving the rectangularly shaped brush 23 to permit its radial sliding movement toward armature contact surface 21. A lower groove 63 formed from two side walls 65,67 and a bottom wall 69 guide the bottom edge of the brush. An upper groove 71 formed from two side walls 73,75 and a top wall 77 guide the top edge of the brush.

Referring again to FIG. 8, a pair of openings 79,81 are formed on either side of opening 59 for receiving the outer edges of coil spring 31, as shown in FIG. 7. Opening 81 includes at its radially inner end a rectangular opening 83 for receiving the outer end of arm portion 37 and tongue 43, as illustrated in FIG. 10.

Coil portion 47 of coil spring 31 moves within the three chambers or openings 79,59,81 as the brush wears. As shown in FIG. 10, dotted lines represent several of the positions of coil 31 as the coil portion 47 moves radially inward during brush wear.

Referring again to FIGS. 8 and 9, an electrical contact member 85 passes through an aperture 86 in end head 15 and is disposed at the inner radially inward end of opening 79. As the coil portion 47 of coil spring 31 moves along the chambers 79,59,81 from its radially outward position to its radially inward position, as shown in FIG. 10, coil portion 47 mechanically contacts electrical contact member 85. This is shown more particularly in FIG. 11.

An outer surface portion 87 of coil spring 31 makes mechanical contact with contact member 85. As shown in FIG. 10, surface portion 87 moves along a path 89 as the brush wears down. When the coil is in its fully extended position, surface portion 87 is located at point P1 on path 89. From point P1, surface portion 87 travels path 89 until it mechanically contacts contact member 85. As will suggest itself, contact member 85 may be located at other positions within the three chambers. For example, member 85 may be located at position 91. Then the surface portion 93 of the coil spring will make mechanical contact with member 85. The surface portion 93 will travel a shorter path as the coil spring moves along the three chambers. Also, the surface portion 93 will not begin to move until the coil spring has traverse a portion of the chambers. In addition, portion 87 may be a component separate from the spring coil 31, which may be attached to coil 31 or moved or controlled thereby.

Figure 12:
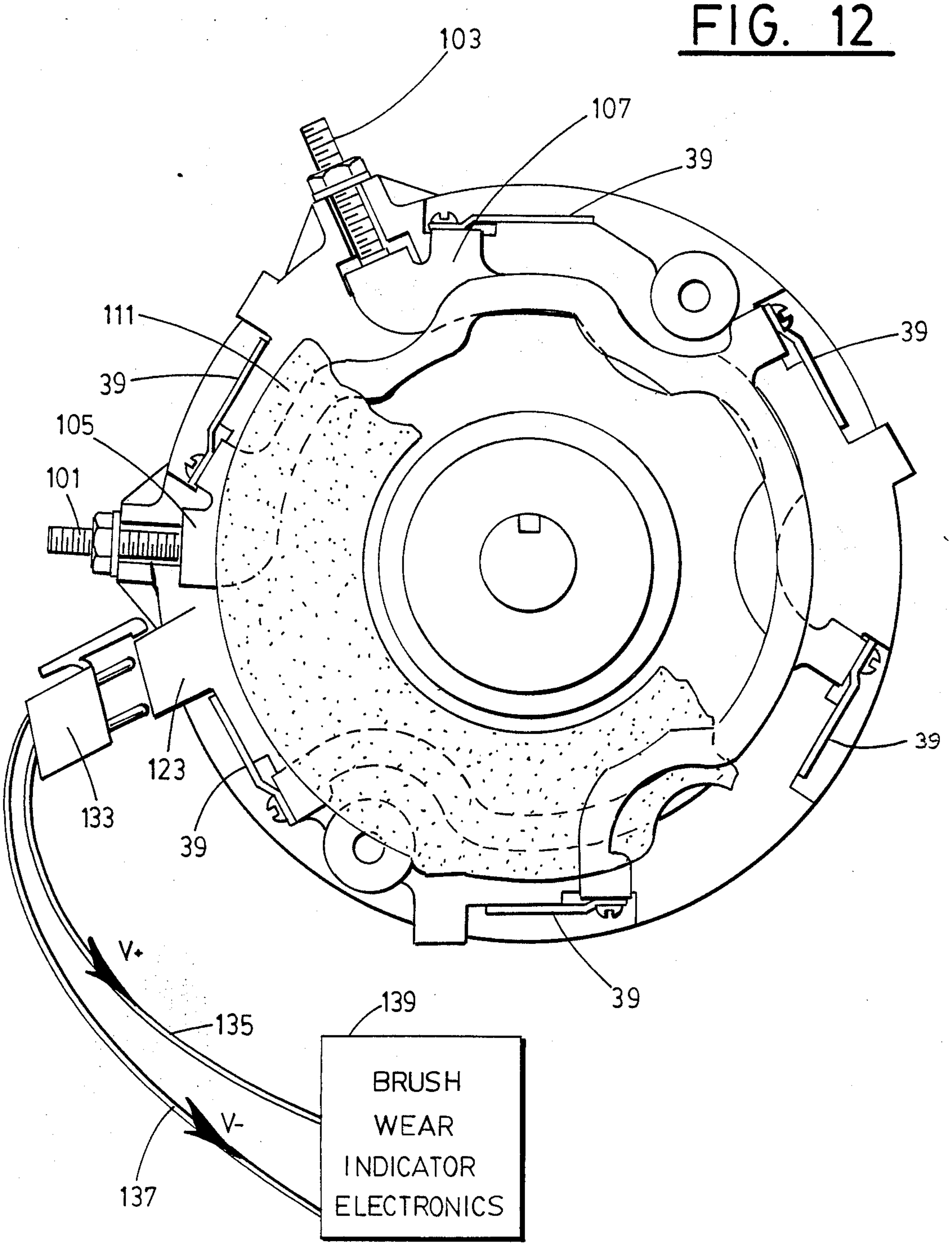
FIG. 12 is a top view of the commutator end head of the motor of FIG. 1.

Referring to FIG. 12, a pair of electrical terminals 101,103 provide a location for connection of positive and negative current connectors for transmission of electrical current to brushes 23. A pair of electrical conductor segments 105,107 carry current from terminals 101,103 to the outer wall member 39 of each brush assembly 25. Electrical conductors 33,35 (FIG. 6) carry the current from the outer wall member 39 to brush 23.

The conductor segment 105 carries current to every other brush around the circumference of end head 15, and conductor segment 107 carries current to the remaining brushes. Electrical conductor segment 107 extends from terminal 103 to provide electrical current to three of the brush assemblies 23. An insulating layer 111 is positioned between the two electrical conductor segments 105,107 for insulating the same. As shown in FIG. 12, conductor segment 107 circles around the top of end head 15 making contact with every other outer wall member 39 of the brush assemblies.

As shown in FIG. 2, electrical conductor segment 107 extends downwardly to terminal 103 and conductor segment 105 extends downwardly to terminal 101. A conductor segment tab 109 extends downward from the electrical conductor segment and includes an opening for receiving screw 49 (FIG. 7) for securing the electrical conductor segment into physical contact with the outer wall member 39 of the brush assembly.

Because spring coil 31 is formed of an electrically conductive metal, the current supplied to terminals 101,103 is also supplied across the coil portion 47 of the coil springs. Thus, when the coil portion 47 makes mechanical contact with electrical contact member 85 current flows to the electrical contact 85. That is, since all components of the brush assembly (connector plate 29, conductors 31,33, coil spring 31 and brush 23) are electrically conductive, current is carried to contact member 85 which is also electrically conductive.

As shown in FIG. 7, six contact members 85 are referenced using numerals 85A through 85F. Contact member 85A is electrically connected by a wire 113 to contact member 85B which is electrically connected by a wire 117 to contact member 85C. Similarly, contact member 85D is electrically connected by a wire 119 to a contact member 85E which is electrically connected by a wire 121 to a contact member 85F. Contact members 85C,85F are electrically connected to a plug assembly 123 via wires 125, 127. Plug assembly 123 is molded from the plastic material of commutator end head 15.

As will suggest itself, wires 113,117,125,119, 121 and 127 are covered with an insulative material except for their ends which make electrical contact with contact members 85A–F and plug assembly 123. Plug assembly 123 includes two metal plug elements 129,131.

When mechanical contact occurs between the coil surface portion 87 and contact member 85, an electrical signal is generated or developed onto contact member 85. That signal is then developed at plug assembly 123.

Referring to FIG. 12, a mating receptacle 133 releasably attaches to plug assembly 123 for developing the electrical signal appearing on wire 125 (FIG. 7) onto wire 135 (FIG. 12) and for developing the electrical signal appearing on wire 127 (FIG. 7) onto wire 137 (FIG. 12). Wires 135,137 are connected to a conventional brush wear indicator 139 for signaling brush wear indication upon the sensing of current along either wires 135,137. The brush wear indication signal may be a visual or audio signal.

As will suggest itself, all of contact members 85A–F may be connected together to provide a single wire output from a single metal plug element, instead of two metal plug elements 129,131.

While only a single, preferred embodiment of the invention has been described hereinabove, those skilled in the art will recognize that that embodiment may be modified and altered without departing from the central spirit and scope of the invention. Thus the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

We claim:

1. Apparatus for indicating brush wear for an electrical appliance, by providing an electrical signal indicating that a brush is worn down to a point of extending brush wear, comprising:

a wearable brush moveable toward a contact point in the appliance, said brush deteriorating at said contact point during operation of the appliance;

spring means for biasing said brush toward said contact point, said spring means including a portion moveable along a path during at least some of the time said brush is moved during wear of said brush; and electrical signal generator means having a member disposed in said path for making mechanical contact with said portion of said spring means when said brush is worn down to a point of extended brush wear, said electrical signal generator means for generating an electrical signal in response to the making of said mechanical contact.

2. Apparatus according to claim 1 wherein said spring means includes a coil spring biased for retracting, said coil spring forcing said brush toward said contact point.

3. Apparatus according to claim 1 wherein said spring means includes a coil spring and wherein said portion includes a surface of said coil spring moveable along said path during at least some of the time said brush is moved toward said contact point.

4. Apparatus according to claim 2 wherein said coil spring includes an end secured in a fixed position with respect to the appliance.

5. Apparatus according to claim 2 and further including a connector plate secured in a fixed position with respect to the appliance, and wherein said coil spring includes a first end secured to said connector plate and a second end which coils as said brush is moved toward said contact point.

6. Apparatus according to claim 5 and further including electrical conductor means having at least one flexible conductor, one end of said conductor being secured to said connector plate and the other end of said one conductor being secured to said brush.

7. Apparatus according to claim 1 wherein said member includes an electrical contact for making mechanical contact with said portion of said spring means.

8. A brush wear indicator according to claim 7 wherein said portion of said spring means carries an electrical signal and wherein said electrical signal is received by said electrical contact upon mechanical contact of said electrical contact with said portion of said spring means to generate an electrical signal at said electrical contact.

9. Apparatus according to claim 5 wherein said connector plate includes tongue means for holding said first end to said connector plate.

10. A brush assembly for an electrical appliance which has an armature rotatable relative to a frame of the appliance and which has a means for generating an electrical signal to indicate brush wear, comprising a connector plate replaceably securable to the frame of the appliance;

a brush movably mounted with respect to said connector plate; and spring means secured to said connector plate for biasing said brush for movement relative to said connector plate, said spring means having a portion moving along a path as said brush is moved relative to said connector plate and providing a contact surface for making mechanical contact with the generating means of the electrical appliance at a point along said path.

11. A brush assembly according to claim 10 wherein said spring means includes a coil spring having a bias for retracting, said bias forcing said brush to an extended position, and wherein said coil spring includes a coil portion moveable along said path as said brush is moved toward said extended position.

12. A brush assembly according to claim 11 wherein said coil spring includes an end secured to said connector plate.

13. A brush assembly according to claim 10 and further including electrical conductor means having at least one flexible conductor, one end of said one conductor being secured to said connector plate and the other end of said one conductor being secured to said brush.

14. A brush assembly according to claim 13 wherein said electrical conductor means includes a pair of conductors.

15. A brush assembly according to claim 10 wherein said connector plate includes an elongated arm and a support wall disposed normal to said elongated arm, and wherein said spring means includes a coil spring.

16. Apparatus according to claim 15 wherein said elongated arm includes tongue means for holding said coil spring to said connector plate.

17. A motor having a brush wear indicator comprising an armature;

a brush assembly support structure including an opening;

a brush assembly including;

(i) a connector plate secured to said support structure relative to said opening;

(ii) a brush movably disposed with respect to said connector plate and slidably mounted within said opening for movement toward a contact point, said brush deteriorating at said contact point upon operation of the appliance;

(iii) spring means for biasing said brush toward the contact point, said spring means having a portion moving along a path as said brush is moved toward the contact point during wear of said brush; and electrical signal generator means including a member disposed in said path for making mechanical contact with said portion of said spring means when said brush is worn down to a point of extended brush wear, said electrical signal generator means for generating an electrical signal indicative of said brush being at a predetermined wear.

18. A motor according to claim 17 wherein said brush assembly support structure is formed from an insulative material.

19. A motor according to claim 17 wherein said brush assembly support structure is molded from plastic.

20. A motor according to claim 15 wherein said brush assembly support structure includes an end head surrounding a portion of said armature.

21. A motor according to claim 17 wherein said spring means includes a coil spring biased for retracting, said coil spring forcing said brush toward said contact point.

22. A motor according to claim 17 wherein said spring means includes a coil spring and wherein said portion includes a surface of said coil spring moveable along said path during at least some of the time said brush is moved toward said contact point.

23. A motor according to claim 21 wherein said coil spring includes an end secured in a fixed position.

24. A motor according to claim 21 wherein said coil spring includes a first end secured to said connector plate and a second end which coils as said brush is moved toward said contact point.

25. A motor according to claim 24 and further including electrical conductor means having at least one flexible conductor, one end of said conductor being secured to said connector plate and the other end of said one conductor being secured to said brush.

26. A motor according to claim 17 wherein said member includes an electrical contact for making mechanical contact with said portion of said spring means.

27. A motor according to claim 26 wherein said portion of said spring means carries an electrical signal and wherein said electrical signal is received by said electrical contact upon mechanical contact of said electrical contact with said portion of said spring means to generate an electrical signal at said electrical contact.

28. A motor according to claim 17 wherein said connector plate includes an elongated arm and a support wall disposed normal to said elongated arm, and wherein said spring means includes a coil spring.

29. A motor according to claim 17 and further including brush wear indicator means connected to said electrical signal generator means and responsive to generation of said electrical signal for generating an indication of brush wear.

30. A motor according to claim 28 wherein said elongated arm includes tongue means for holding said coil spring to said connector plate.

* * * * *